United States Patent [19]

Green et al.

[11] Patent Number: 4,463,109

[45] Date of Patent: Jul. 31, 1984

[54] ASBESTOS FREE JOINTING

[75] Inventors: David Green; Alan D. Stancliffe, both of Rochdale; Lawrence W. Ramsbottom, Halifax; David A. Thomas, Littleborough, all of England

[73] Assignee: TBA Industrial Products Limited, Manchester, England

[21] Appl. No.: 558,712

[22] Filed: Dec. 7, 1983

[30] Foreign Application Priority Data

Mar. 12, 1981 [GB] United Kingdom ............... 8107802

[51] Int. Cl.$^3$ .............................................. C08D 7/04
[52] U.S. Cl. .................................. 523/333; 524/426; 524/427; 524/494
[58] Field of Search ................ 523/333; 524/426, 427, 524/494

[56] References Cited

U.S. PATENT DOCUMENTS

| | | | |
|---|---|---|---|
| 3,508,950 | 4/1970 | Marzocchi | 523/217 X |
| 3,513,049 | 5/1970 | Marzocchi | 427/221 X |
| 3,635,879 | 1/1972 | Baer et al. | 524/494 X |
| 3,705,075 | 12/1972 | Marzocchi | 523/205 X |
| 3,728,146 | 4/1973 | Marzocchi | 523/205 X |
| 4,140,830 | 2/1979 | Williams et al. | 428/492 X |
| 4,156,677 | 5/1979 | Williams et al. | 260/42.15 |
| 4,163,073 | 7/1979 | Pepe et al. | 427/221 |
| 4,317,575 | 3/1982 | Cavicchio | 277/DIG. 6 X |

FOREIGN PATENT DOCUMENTS

| | | |
|---|---|---|
| 1062595 | 3/1967 | United Kingdom . |
| 1087905 | 10/1967 | United Kingdom . |
| 1314736 | 4/1973 | United Kingdom . |
| 1346951 | 2/1974 | United Kingdom . |
| 1578613 | 11/1980 | United Kingdom . |

*Primary Examiner*—Marion McCamish
*Assistant Examiner*—Nancy A. B. Swisher
*Attorney, Agent, or Firm*—Cushman, Darby & Cushman

[57] ABSTRACT

Asbestos-free fibre reinforced sheet material comprises from 10 to 35% by weight of a cured elastomeric binder and from 20 to 70% by weight of glass fibres (including ceramic fibres, or mineral fibres or mixtures of these) surface treated with a composition which is readily soluble in the solvent used in compounding the elastomeric binder.

13 Claims, No Drawings

ASBESTOS FREE JOINTING

This is a continuation of application Ser. No. 356,505, filed Mar. 9, 1982 now abandoned.

This invention relates to sheet materials comprised of reinforcing fibres and an elastomeric binder.

In particular, it is concerned with the production of such sheet by the "it" calendering process as described for example in the specification of British Pat. No. 1541013. The process is well-known and dates from the turn of the century, so it need not be described in great detail here. In "it" calendering, a sheet material is built up as a series of very thin layers, e.g. 0.0004 inch, which are successively formed on the circumference of a heated calender bowl. Sheet formation is by feeding a relatively stiff, fibre filled and curable elastomeric dough to a nip between the calender bowl and an unheated auxiliary roller, the nip separation being adjusted continuously or stepwise to achieve the desired rate of sheet build-up and consolidation. For the purposes of this specification, "calendering" means "it" calendering by the process just described.

The dough used in "it" calendering must be carefully formulated to achieve satisfactory sheet formation at high fibre contents. In this context, the characteristics of the reinforcing fibre are a very significant factor; the only fibre used to any significant extent is asbestos.

Asbestos has a high aspect ratio (length/diameter), extreme ultimate fibril fineness and very high surface area; these characteristics render it especially suitable for dispersion into curable elastomer compositions for subsequent calendering into sheets. However, the ultimate fibril diameter may be below 1 micron and fibres below 3 microns are generally accepted to be respirable and potentially injurious to health, unless suitable precautions are taken in their handling.

It is known to compound glass fibres into polymeric materials. It is also known to do so using the "it" calendering process. Our UK patent specification No. 1578613 discloses the production of rigid sheets comprised of vinyl chloride polymer and incorporating glass fibres, the latter constituting from 5 to 30% of the sheet, with the polymer constituting from 30 to 75% and the remainder being particulate filler in an amount of from 20 to 50%, (all percentages being by weight). However, when it is desired to produce glass fibre reinforced elastomer sheet useful as a replacement for the "CAF" (compressed asbestos fibre) elastomer sheet employed in gaskets, it is necessary to operate at higher fibre contents, typically 20 to 70% by weight. The polymer content is correspondingly lower, in the range 15 to 35%. Under these conditions, the compounding techniques used for conventional CAF do not give satisfactory results because glass fibres simply do not disperse properly in the elastomer or do not do so without suffering considerable damage. It is also desirable to achieve a high standard of surface finish, direct from the calender without any ancillary pressing operations. Glass fibre in this context should be understood to include not only glass fibres, but also mixtures of glass fibres with mineral fibres such as slag or rockwool.

According to the present invention, an "it" calendered asbestos-free fibre reinforced sheet material comprises from 10 to 35% by weight of a cured elastomeric binder and from 20 to 70% by weight of glass fibres surface treated with a composition readily soluble in the solvent used in compounding the elastomeric binder. Preferably the elastomeric binder constitutes from 15 to 30% by weight of the sheet the elastomer being selected from the group comprising natural rubber, styrene butadiene rubber, acrylonitrite butadiene rubber, or mixtures of these, polychoroprene, or chlorosulfonated polyethylene.

It has been found that the surface treatment is very important in achieving proper dispersion of the glass fibres in the elastomeric binder during production of the elastomer dough for "it" calendering. It helps to ensure that the individual fibres are coated with elastomer, thereby minimizing processing time and consequent damage to the fibres. The composition may be applied to the glass fibres during or after their manufacture; aromatic and aliphatic polyurethanes are particularly satisfactory, but other materials such as polybutadiene or polyester may be used. The glass fibres are preferably in the range of from 3 to 25 microns in diameter and from 3 to 12 mm in length. It is possible to use a mixture of fibres of different lengths within the range in order to achieve optimum strength and processability. A mixture of chopped strand glass fibres of lengths 3 mm and 6 mm respectively has proved satisfactory, for example.

The invention also includes a method of making an asbestos-free fibre reinforced sheet by "it" calendering a curable elastomeric dough containing glass fibres surface treated with a composition which is readily soluble in the solvent used in compounding the elastomer dough. The method preferably includes the step of compounding the dough.

Treatment of the glass fibres greatly alleviates the problem of dispersing them in an elastomer dough, but it is also important to note that the fibres should be kept dispersed and adequately coated with elastomer if processing damage is to be minimized. Use of a higher-than-usual (for asbestos) dough viscosity is advantageous, as is the use of a lower-than-usual (for asbestos) fibre content. In particular, the wet/dry ratio (total wet divided by the total dry solids weight) of the dough should be somewhat reduced in comparison to an equivalent asbestos-filled dough.

Conventional asbestos-filled doughs might be compounded at a wet/dry ratio in the range 1.5 to 2.2, but otherwise similar glass fibre-filled doughs would be in the range 1.2 to 2.0, with 1.5 to 1.8 being a particularly preferred range.

Conventional acidic accelerator/sulphur curing systems can be used, but as a fast cure is needed for satisfactory calendering, the dough should be alkaline. Because of the complete absence of alkalinity due to asbestos, it is necessary to include an alkali such as soda ash. This preferably added as a solution in water, the latter being also release agent for calendering.

It is important to add the water towards the end of the mixing operation after the fibres have been coated with the curable elastomer composition.

A particularly preferred aspect of the invention lies in the use of reinforcing filters in the dough. Conventional fillers are used in asbestos-filled doughs as diluents; such fillers are coarse and generally inert. In the vitreous fibre-filled doughs of this invention it is preferred that reinforcing fillers are used. These are fine particle size materials with active surfaces; they serve to reinforce rather than merely fill (dilute) the dough. Carbon black, silica, silicates, and precipitated calcium carbonate are examples of particularly suitable reinforcing fillers.

Reference was made earlier to the use of lower-than-usual fibre contents. In fact, the fibre content in a typical glass fibre filled dough is only of the order of ½ to 170 that used with asbestos. The elastomer content may be from 1½ to 2½ times that than when asbestos is used. These are not the only differences; calendering should be carried out at a substantially faster rate of nip separation.

To prepare a calender for use with such a glass fibre filled dough, the surface of the heated bowl may be treated with a solution of unsecured elastomer composition in solvent, to control the degree of adhesion of the dough at the start and end of calendering.

In order that the invention be better understood preferred embodiments of it will now be described by way of example.

EXAMPLE A

A dough was compounded from the following ingredients:

| | |
|---|---|
| Natural Rubber | 3.00 kg |
| Styrene butadiene rubber | 2.12 kg |
| Acrylonitrile butadiene rubber | 2.10 kg |
| Glass fibers 6 mm | 10.00 kg |
| Glass fibers 3 mm | 3.20 kg |
| Carbon black | 0.40 kg |
| Calcium carbonate (precipitated) | 5.65 kg |
| Sulphur based curing system | 0.25 kg |
| Soda Ash | 0.16 kg |
| Lorco Bantac (commercial release agent) | 0.17 kg |
| Toluene | 14.00 kg |
| Water | 2.40 kg |

The glass fibres were nominally 10 microns in diameter; they were chopped from strand treated with an aminosilane coupling agent and a toluene-soluble aromatic polyurethane composition.

EXAMPLE B

| | |
|---|---|
| Natural Rubber | 1.18 kg |
| Styrene butadiene rubber | 0.51 kg |
| Acrylonitrile butadiene rubber | 0.62 kg |
| Glass fibers 3 mm | 3.00 kg |
| Mineral fiber (silane treated) | 1.00 kg |
| Calcium carbonate (precipated) | 0.51 kg |
| Barytes | 2.47 kg |
| Carbon black | 0.30 kg |
| Sulphur based curing system | 0.16 kg |
| Soda Ash | 0.16 kg |
| Toluene | 6.0 kg |
| Water | 0.6 kg |

The compounding procedure was to mix the fibres and solvent for 5 minutes in a spike mixer. The rubbers fillers and curing system were then added and mixed for 45 minutes, followed by adding the soda ash in water followed by the BANTAC.

After 5 minutes further mixing, the batch was ready for calendering. The calender was run with a bowl temperature of 110°–130° C. and a surface speed of about 12 meters/minute.

The products had the following properties:

| | A | B |
|---|---|---|
| Thickness | 0.97 | 0.98 |
| Density kg/m$^3$ × 10$^{-3}$ | 1.37 | 1.46 |
| ASTM compression % | 28.3 | 43.9 |
| ASTM recovery | 64.2 | 58.6 |
| ASTM Tensile strength with-grain MNm$^{-2}$ | 42.9 | 25.8 |
| ASTM Tensile strength across-grain MNm$^{-2}$ | 5.7 | 3.4 |
| Thickness Increase % | | |
| After 5 hrs. at 150° C. in ASTM Oil 1 | 11.0 | 17.0 |
| After 5 hrs. at 150° C. in ASTM Oil 3 | 28.7 | 28.5 |
| After 22 hrs. at 20° C. in ASTM Fuel A | 13.8 | 17.3 |
| After 22 hrs. at 20° C. in ASTM Fuel B | 25.7 | 34.3 |
| After 7 hrs. at 100° C. in Antifreeze | 2.5 | 12.1 |
| Weight Increase % | | |
| After 5 hrs. at 150° C. in ASTM Oil 1 | 32.0 | 30.3 |
| After 5 hrs. at 150° C. in ASTM Oil 3 | 45.8 | 48.3 |
| After 22 hrs. at 20° C. in ASTM Fuel A | 21.8 | 25.8 |
| After 22 hrs. at 20° C. in ASTM Fuel B | 38.4 | 38.4 |
| After 7 hrs. at 100° C. in Antifreeze | 27.2 | 29.0 |
| Sealing Characteristics (nitrogen gas at 1.4 MNm$^{-2}$) | | |
| Surface stress to seal, MNm$^{-2}$ | 14.6 | 16.9 |
| Shear strength, MNm$^{-2}$ | 20.7 | 19.6 |
| Stress relaxation MNm$^{-2}$ (British Standard) | 16.9 | 17.6 |

EXAMPLE C

This example was made up to have a body (core) portion with surface layer portions of a slightly different formulation.

| | kg |
|---|---|
| Body formulation | |
| Natural rubber | 0.500 |
| Acrylonitrile butadiene rubber (NBR) | 2.060 |
| Acrylonitrile butadiene rubber (lightly cross-linked) | 1.050 |
| 6 mm chopped glass | 6.600 |
| Precipitated calcium carbonate | 3.000 |
| Curing System | 0.300 |
| Pigment | 0.150 |
| Soda Ash | 0.130 |
| Toluene | 8.0 liters |
| Water | 1.2 liters |
| Surface layer formulation | |
| Natural rubber | 0.800 |
| Acrylonitrile butadiene rubber (NBR) | 3.300 |
| Acrylontrile butadiene rubber (lightly cross-linked) | 1.680 |
| 3 mm chopped glass | 2.500 |
| Precipitated calcium carbonate | 4.800 |
| Barytes | 8.000 |
| Curing System | 0.420 |
| Pigment | 0.240 |
| Soda Ash | 0.200 |
| Toluene | 9.5 liters |
| Water | 1.2 liters |

The compounding was carried out by dry mixing for five minutes in a spike mixer, the solvent was then added and mixed for 45 minutes. The soda ash solution was added and mixed for 5 minutes. The calendering operations were carried out as before, but using two doughs, of course. 1.2 kg of surface dough was calendered first, followed by 10 kg of body dough, followed by another 1.2 kg of surface dough, to make the desired product with a core and surface layers.

When tested the sheet properties are as follows:

| | |
|---|---|
| Thickness mm | 0.851 |
| Density kg/m$^3$ × 10$^{-3}$ | 1.280 |

-continued

| | |
|---|---|
| ASTM Compression % | 24.4% |
| ASTM Recovery % | 64.2% |
| ASTM Tensile strength with-grain MN$^{-2}$ | 59.1 |
| ASTM Tensile strength cross-grain MNm$^{-2}$ | 10.8 |
| Thickness Increases | |
| After 5 hrs. at 150° C. in ASTM Oil 1 | 2.9% |
| After 5 hrs. at 150° C. in ASTM Oil 3 | 6.9% |
| After 22 hrs. at 22° C. in ASTM Fuel A | 2.4% |
| After 22 hrs. at 22° C. in ASTM Fuel B | 11.8% |
| After 5 hrs. at 100° C. in Anitfreeze | 0.7% |
| Weight Increases | |
| After 5 hrs. at 150° C. in ASTM Oil 1 | 23.8% |
| After 5 hrs. at 150° C. in ASTM Oil 3 | 30.1% |
| After 22 hrs. at 150° C. in ASTM Fuel A | 15.6% |
| After 22 hrs. at 150° C. in ASTM Fuel B | 25.6% |
| After 5 hrs. at 100° C. in Antifreeze | 22.4% |
| ASTM Stress Relaxation | |
| Low load | 25.4% |
| High load | 84.1% |
| Stress Relaxation MN$^{-2}$ (British Standard) | 21.2 |
| Sealing Test (nitrogen gas at 1.4 MNm$^{-2}$) | |
| Surface stress to seal MNm$^{-2}$ | 21.2 |

We claim:

1. A process for making an asbestos-free glass fiber reinforced sheet composed of individual glass fibers distributed throughout an elastomer system, said process comprising the successive steps of:
    (1) providing glass fibers having a surface treatment coating being readily soluble in the solvent used in compounding the curable elastomer dough facilitating coating of the elastomer onto the glass fibers;
    (2) mixing the glass fibers off step (1) with a solvent and removing the surface treatment coating;
    (3) preparing a curable elastomer dough by mixing the glass fibers and solvent of step (2) with a curable elastomer in amounts such that the finished fiber reinforced sheet contains from about 10 to about 35% by weight of elastomer and from about 20 to about 70% by weight of said glass fibers;
    (4) mixing and compounding the curable elastomer dough prepared in step (3) until the glass fibers are dispersed throughout the elastomeric binder and the individual glass fibers are coated with elastomer; and
    (5) subjecting the compounded curable elastomeric dough to "it" calendering until an absestos-free fiber reinforced sheet of the desired thickness is produced.

2. The process as claimed in claim 1 in which the total wet weight divided by the total dry solids weight of the dough prepared in step (2) is in the range of about 1.2 to about 2.0.

3. The process of claim 2 in which the wet/dry ratio is in the range of about 1.5 to about 1.8.

4. The process as claimed in claim 1 in which the dough prepared in step (2) also includes an accelerator and curing system.

5. The process as claimed in claim 1 in which the dough prepared in step (2) also includes fine particles of at least one reinforcing filler having active surfaces to reinforce the dough.

6. The process as claimed in claim 5 in which the reinforcing filler is carbon black, silica, silicates, precipitated calcium carbonate, or mixtures thereof.

7. The process as claimed in claim 1 in which the elastomer is natural rubber, styrene-butadiene rubber, acrylonitrile-butadiene rubber or mixtures of such rubbers, polychloroprene or chlorosulfonated polyethylene.

8. The process of claim 1 in which the glass fibers have a diameter of about 3 to about 25 microns.

9. The process of claim 8 in which the glass fibers of step (1) have a diameter in the range of about 3 to about 12 microns.

10. The process of claim 1 in which the glass fibers provided in step (1) have a length of about 3 to about 12 mm.

11. The process of claim 1 in which a mixture of glass fibers of different lengths within said range is used.

12. The process of claim 14 in which the elastomeric binder is added in step (2) in an amount such that the finished fiber reinforced sheet contains about 15 to about 30% of elastomeric binder.

13. The asbestos-free glass fiber-reinforced sheet produced by the process of claim 1.

* * * * *